Aug. 17, 1965  J. W. BLYTH ETAL  3,200,513
MECHANICAL TEACHING MACHINE
Filed June 14, 1961  6 Sheets-Sheet 4

INVENTOR.
JOHN W. BLYTH
CHARLES A. GODCHARLES
JOHN H. JACOBSON
WALTER J. ROZMUS

BY *Watts Edgerton Ryle & Fisher*

ATTORNEY

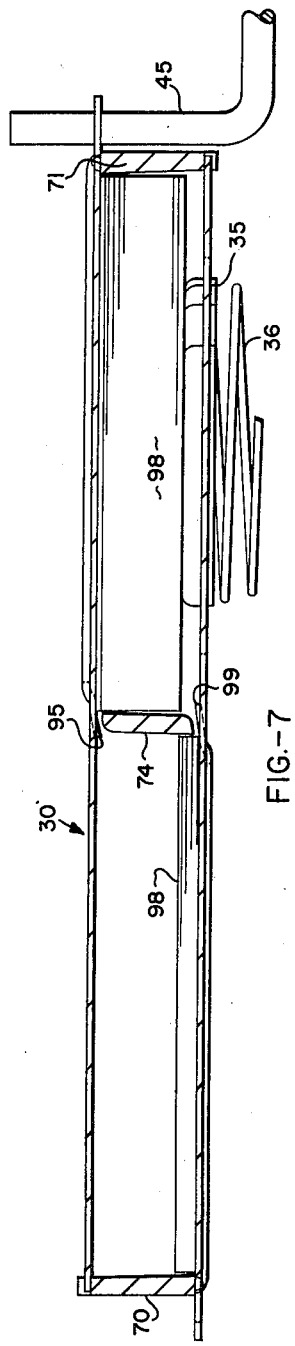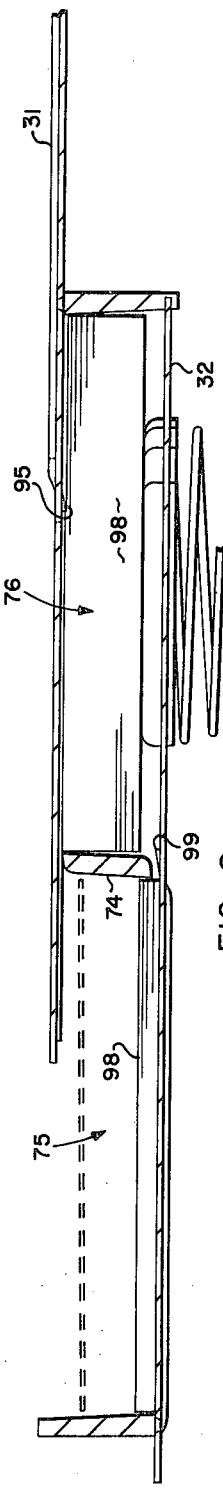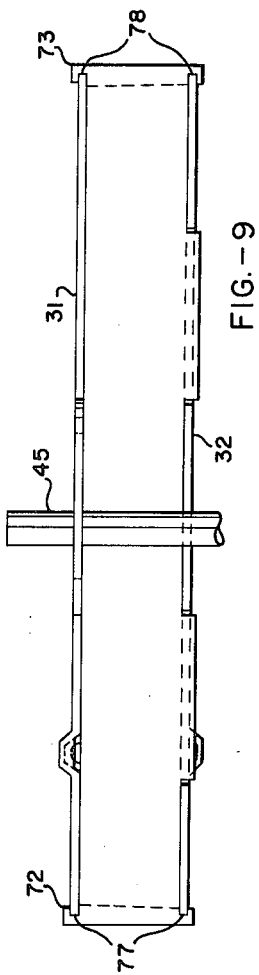

Aug. 17, 1965  J. W. BLYTH ETAL  3,200,513
MECHANICAL TEACHING MACHINE
Filed June 14, 1961  6 Sheets-Sheet 6
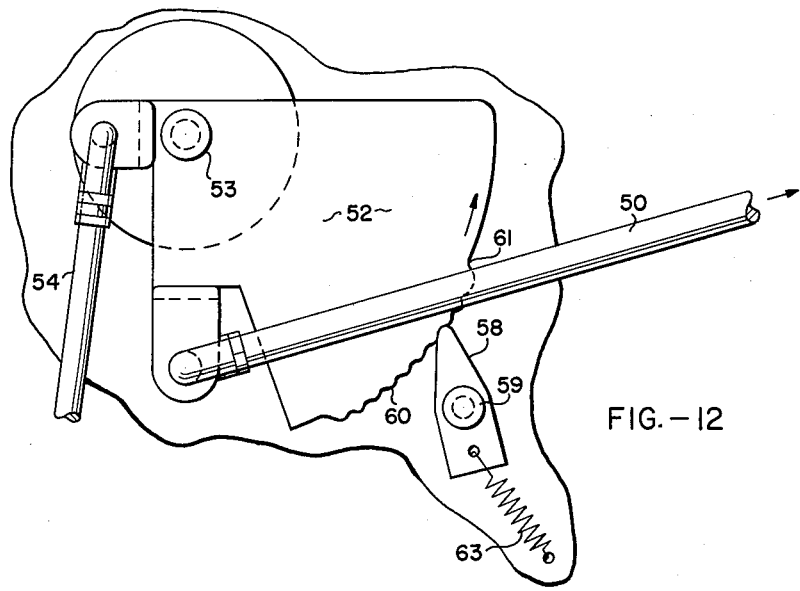
FIG.—12
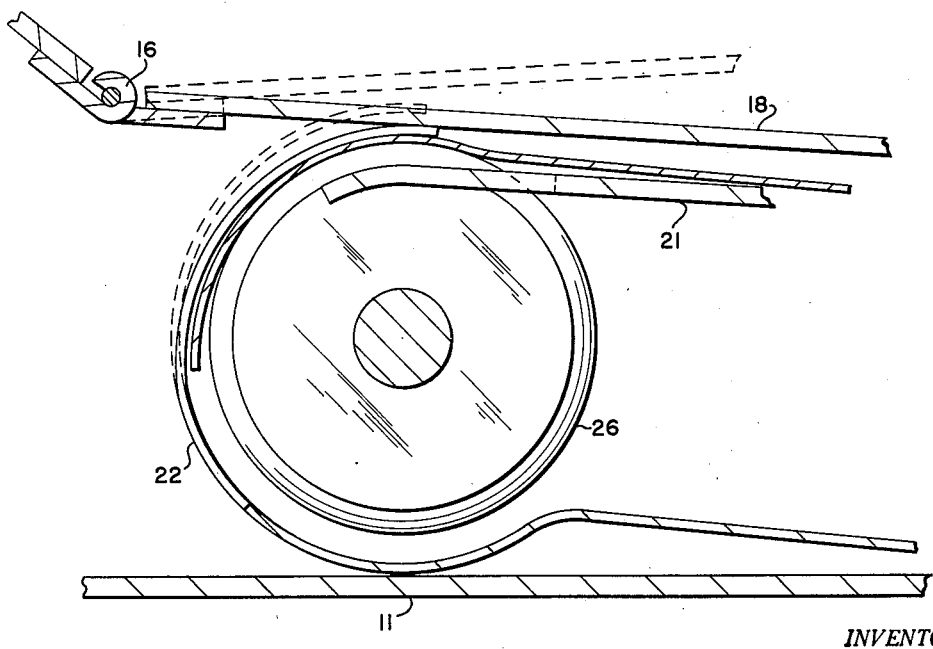
FIG.—11
INVENTOR.
JOHN W. BLYTH
CHARLES A. GODCHARLES
JOHN H. JACOBSON
WALTER J. ROZMUS
BY Watts Edgerton Pyle & Fisher
ATTORNEY

United States Patent Office 3,200,513
Patented Aug. 17, 1965

3,200,513
MECHANICAL TEACHING MACHINE
John William Blyth, Charles Augustus Godcharles, and John Howard Jacobson, Clinton, and Walter John Rozmus, Hubbardsville, N.Y., assignors to Hamilton Research Associates, Inc.
Filed June 14, 1961, Ser. No. 117,049
11 Claims. (Cl. 35—9)

This invention relates to educational training devices and more particularly to that class of devices which are known as "teaching machines."

In recent years, the need for new and improved teaching aids to relieve teachers' burdens has been increasingly recognized. It has also been increasingly and more frequently recognized that mechanical teaching aids can be extremely helpful in instruction. It has, in fact, been established to the satisfaction of many educators that many, if not all, subjects can be taught with greater rapidity and facility if mechanical teaching aids are used.

The mechanical teaching aids which have been used in establishing this fact utilize the interrogatory method of teaching. That is, the student is presented with a question which he seeks to answer. He then sees the correct answer and determines whether or not his answer was correct. The student will repeat this process through a properly programmed group of questions.

This invention is directed to an improved and simplified mechanism for teaching. With this mechanism, a group of question and answer cards are positioned within a housing. An answer sheet is also positioned within the housing. The question cards are indexed one at a time into a viewing position.

A space for an answer, corresponding to the indexed question, is simultaneously positioned at an accessible location. When the student has read the question and written in his answer in the corresponding space, he actuates an indexing mechanism which exposes the answer to the question. Simultaneously, as the answer is exposed, the answer sheet is indexed one space to shift the student's answer under a window so that the answer is no longer accessible to him. Simultaneously a corresponding correction space is positioned beneath a correction aperture adjacent the window. If the student has written the wrong answer in his answer space he then writes the correct answer in the correction space. He next indexes another question into position, writes another answer, and then indexes the machine again to expose the answer to the second question. So he proceeds until he has concluded with a given group of questions.

The finished answer sheet, completed in this described manner, gives the instructor a simplified, quick and accurate method of appraising the progress a given student is making. It also permits him to make a ready and accurate comparison among students. Through this comparison, the instructor can easily determine whether or not his questions have been programmed properly.

The machine disclosed here utilizes a novel and improved question card magazine described and claimed in greater detail in copending application for patent, Serial No. 117,010, now U.S. Patent No. 3,134,177 filed concurrently by Walter J. Rozmus for "Magazine for Teaching Machine." With one such magazine positioned in the machine described here, cards are positioned in front of a viewing aperture in the machine one at a time. A section of the card is covered and a section of the card is exposed during the first portion of the indexing cycle. During a second portion of an indexing cycle the both sections of the card are exposed. When all of the cards of one group have been viewed one at a time and in sequential order, the magazine is inverted and a second group of questions, carried on the backs of the same cards, are then indexed into viewing position one at a time. The magazine and machine are sized such that most types of pictorial data such as charts, maps, pictures, and word messages, may be positioned at the viewing aperture to provide the subject matter of a given question.

A particular feature which will be evident as the description of the preferred embodiment of this invention is described, is the fact that the instructor may use the machine to program his instruction and make the necessary changes in the program as it is developed. Accordingly one of the principal objects of this invention is to provide a novel and simplified teaching machine.

Another object of the invention is to provide a simplified teaching machine which first presents a surface upon which the student may write an answer and simultaneously exposes a proposition or question to be considered; a response is to be written on the answer surface; the machine is adapted to thereafter move the answer surface to a position where it is visible, but inaccessible, and at that time to present a space for writing this correct solution.

A further object of the invention is to provide a simplified teaching machine in which question cards and an answer sheet are separately positioned in a housing and separately accessible but controlled by a single indexing means.

An additional object of the invention is to provide a novel and improved indexing mechanism which simultaneously and with coordination indexes both question cards and an answer sheet to their respective teaching positions in the appropriate sequence.

Other objects and a fuller understanding of the invention may be had by referring to the following description and claims taken in conjunction with the accompanying drawings in which:

FIGURE 7 is a section through the magazine card holder taken along the line 7—7 of FIGURE 6;

FIGURE 8 is a view similar to FIGURE 7 with the card actuating cover of the magazine partially through a cycle to index a card from the top of the stack;

FIGURE 9 is an end view of the magazine taken along the line 9—9 of FIGURE 6;

FIGURE 10 is a fragmentary composite view of the paper advancing mechanism, taken in two portions from FIGURE 3 as illustrated by the two sets of lines 10—10 on FIGURE 3;

FIGURE 11 is on a greatly enlarged scale with respect to FIGURE 3 and taken along the line 11—11 of FIGURE 3; and, FIGURE 12 is an enlarged illustration of the motion converting and control device illustrated in the upper left hand corner of the mechanism as shown in FIGURE 3.

The invention will be defined hereinafter in detail, but a general description will be helpful to a better comprehension. The preferred embodiment will have a case sized for convenient use on a student's school desk, and light enough to carry from class to class if desired. The preferred embodiment of the case has a sloping front which serves as a writing table comfortable for the student to rest his arms as the learning process proceeds. A back portion of the case, farther from the student, tilts up at an angle. The purpose of the upward tilting is to make available space within the housing to accommodate a replaceable cartridge containing a question series and also to hold this cartridge at a convenient reading angle with respect to the student seated before the case.

The description of this preferred embodiment of the invention will include a cartridge of question and answer cards, the subject matter of a separate application as previously indicated. A manually operated handle on the upwardly tilted back portion of the case enables the student to simultaneously index question and answer cards and shift the paper upon which he writes in order to expose proper openings on the sloping table. Thus, without any power devices or other expensive and vulnerable mechanisms, the student is able to index the two separate units simultaneously and properly without difficulty.

The preferred embodiment of this invention incorporates a paper advancing mechanism under the sloping front portion of the case which is operated from the manually operated handle through a linkage arrangement. This linkage arrangement advances the paper in related sequence with the exposing of the question cards. There are three slots in the cover which are conveniently arranged to permit the writing of answers and the entering of corrections.

The question cards are contained in a unique cartridge which enables a program to be carried as a unit. The particular cartridge has questions and answers printed on both sides of the cards. The cards are caused to shift from one side of the carrier cartridge to the other. Then the entire cartridge is removed and flipped over to expose the back side of the cards. They are then once again moved from one side to the other in sequence. Thus, the cards are returned to their original starting position after the complete program has passed through the machine.

Figure 4:
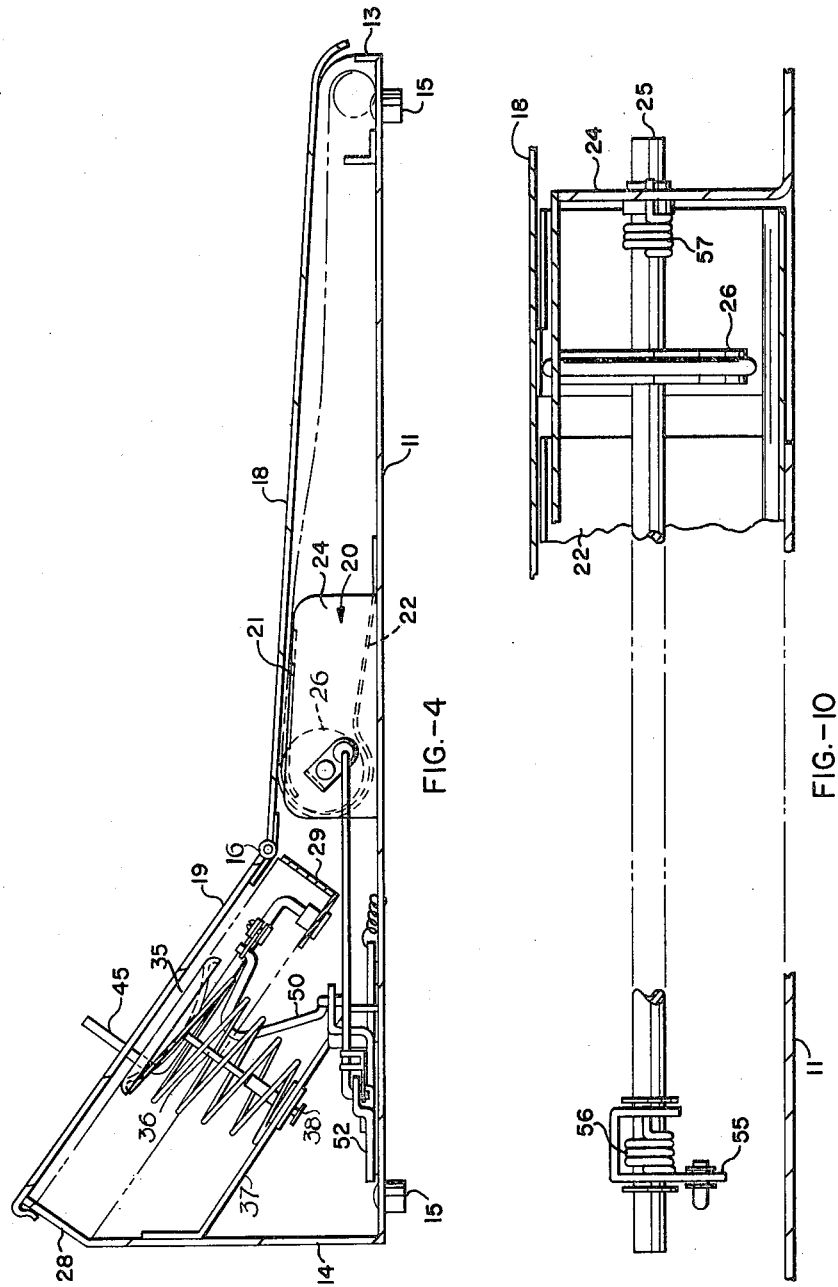
FIGURE 4 is an elevational section taken along the line 4—4 of FIGURE 3, also without the magazine being positioned in the machine.
Figure 5:
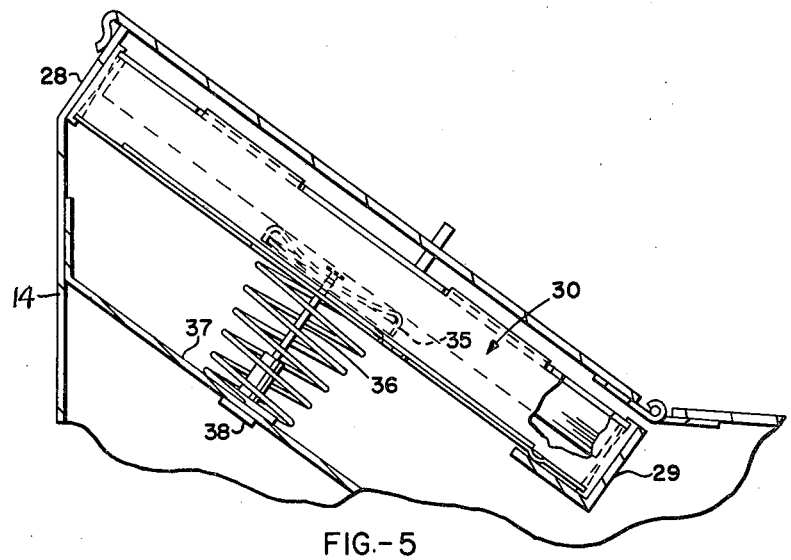
FIGURE 5 is an enlarged section detail illustrating the magazine card holder in position and the spring of the machine compressed against the back face of cards in the magazine.
Figure 6:
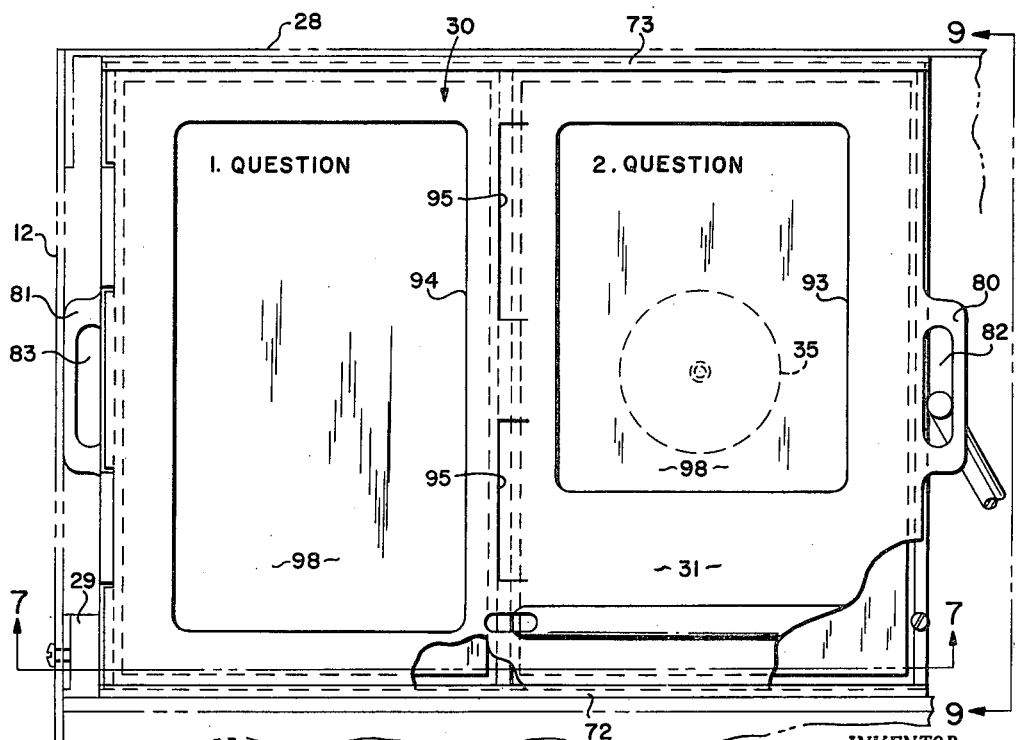
FIGURE 6 is a top plan view of the magazine card holder and illustrates portions of the cooperating teaching machine which support and drive the magazine.

The cartridge, and the paper advancing mechanism are coupled to the manually operated handle and thus are operated simultaneously. In order to better describe the preferred embodiment of the invention the various parts of the housing are numbered for reference purposes. Generally, the entire housing is referred to by the reference character 10. In FIGURE 4 it will be seen that a lower wall 11 provides a bottom for the housing. The housing then includes side walls 12, a short front wall 13 and a high back wall 14. The illustrated embodiment has short supporting legs 15, secured to the lower wall 11.

The housing is closed by two covers 18 and 19. A hinge 16 joins covers 18 and 19. It is sometimes referred to as a piano hinge and extends from one side wall 12 to the other across the housing near the back wall 14. The cover 18 provides a sloping work surface and covers a shallow portion toward the forward part of the housing. This cover, as well as the cover 19, are both carried by the hinge 16, and open in opposite directions. As seen in the drawings, the cover 19 extends upwardly and, therefore, encloses a larger and deeper portion of the housing. In this area, a removable magazine may be employed to carry out some of the functions of this invention and, hence, the cover 19 may be referred to as a magazine cover.

A work sheet carriage and feed structure under the cover 18 is referred to generally by reference 20. This structure 20 is positioned in the housing and secured to the lower wall 11. The structure 20 includes a flat sheet support and writing surface portion 21 which is positioned immediately beneath and parallel to the front cover 18. The purpose of the carriage 20 is to hold a sheet of paper under the cover 18 and provide a backing surface in order that the student may write upon the paper through openings in the cover 18, and the carriage 20 also advances the paper with respect to the openings in order to present new writing surfaces properly related in sequence to the shifting of question cards.

The carriage 20 is a box-like structure having side walls 24 supporting the writing surface 21. A shaft 25 is journaled in the side walls 24 near the forward part of the structure closest to the hinge 16. The forward portion of the writing surface 21 is curved downwardly in this area, and two soft rubber rolls 26 project through slots in the curved portion. Thus, a sheet of paper rested upon the surface 21 may be drawn over the rolls 26 and down around the curved forward portion of surface 21 and returned in a reversed direction toward the student operator.

In order to enable the insertion of a piece of paper, and then to cause the paper to be engaged for positive drive action by rolls 26, a curved guide 22 of yieldable material is carried forwardly of the carriage 20. The height of the surface of rolls 26 with respect to the available room under the cover 18 is just sufficient that whenever the cover 18 is closed the guide 22 will be pressed down to the surface of rolls 26 and hence cause the paper to be pressed down upon the rolls as the cover is closed. Guide 22 is resilient and hence will spring away from the rolls whenever it is unconfined by the cover 18. Hence the student may easily insert the paper between the guide and the rolls and yet the positive drive action will take place immediately upon closing of the cover 18.

Although other types of mechanism for presenting a series of cards may be employed whenever desirable, the illustrated embodiment takes advantage of the cartridge system of the related invention. In order to hold the cartridge snug and yet make it readily removable without any fastening devices, there is provided an angular flange 29 near the hinges 16 at the forward part of the deeper housing. Opposed, and at the top part of the housing, is a flat surface 28. Note that the back wall 14 angles vertically down from the wall 28. Thus, a rectangular shaped cartridge is seated into the angular flange support 29 and then pivoted downwardly against surface 28 to wedge between surfaces 28 and 29. It will be prevented from falling down into the housing by contact with the back wall 14. Thus, without any supporting or holding devices, the cartridge for the question and answer cards is held in frictional engagement by the simple expedient of the cartridge being snug with respect to the spacing between surfaces 28 and 29.

The magazine is best seen in FIGURES 6 through 9. This magazine comprises, in general, a peripheral wall with a center division wall, with two slidable covers on each side of the wall. Thus, in effect, the magazine might be likened to a two-compartment box with a slidable top and bottom cover.

Structurally, the magazine, indicated in the drawings by the reference character 30, is rectangular in form having spaced end walls 70 and 71 with longer side walls 72 and 73. The partition wall is indicated by reference character 74 and extends from one side wall to the other, dividing the frame into equal size chambers 75 and 76.

As the drawings indicate, parallel grooves 77 in the side wall 72, and grooves 78 in the side wall 73, provide guides for top and bottom plates 31 and 32.

At one end of each plate there is an actuation tab which has the appearance of a handle and acts as a handle in many respects. The tab on plate 31 is numbered with reference character 80, and on 32 by the character 81.

These tabs 80 and 81 may be grasped manually but are actually intended for receipt of the extension part of the manual actuation handle rather than by direct personal grip. These tabs, as indicated, have elongated slots 82 and 83 respectively into which the actuation handle may project.

Movement of the plate covers is limited by physical stop members, as well-known and used in such structures.

The purpose of the magazine is to shuffle cards from one compartment to the other as they are used, but to do so in a particular manner in sequence. First, the top card of a stack is only partially exposed. The part that is exposed will bear the question or other subject matter which must be analyzed by the student. A portion of the card is concealed and contains the proper response.

The cover indexing plate is then shifted to expose the entire card including the original subject matter and the response. The student may mark his response paper if correction is indicated. Then, the indexing plate cover is again shifted and moves the card over into the adjacent chamber in order to expose the next card in sequence.

Physically, according to the present invention, in order to carry out this sequence, the indexing plates 31 and 32 are provided with a combination of features which produce the indicated desired result. Referring to plate 31 as an example, this being the top plate in the plan view, it will be seen that there is a smaller aperture 93 to the right of the plate and a larger aperture 94 to the left. When used in the teaching machine, there is a spring device which is part of the case that presses upwardly from the back against the cards in the chamber on the right hand side. Note that the problem or question on the card is exposed to aperture 93, but the answer is hidden behind the metal of the cover. When the cover indexing plate 31 is shifted to the right, the aperture 94 will be positioned above the card in the chamber 76 and hence the answer on that card will be fully exposed. Now then, by placing the magazine under the cover 19 with the chamber 76 exposed through a window aperture 34 in the cover 19, the chamber 75 will be concealed. It is not essential to conceal the chamber 75 because cards shifted to this chamber have been fully examined, but such double exposing would be distracting and hence this part may be positioned under the cover. By actuating the indexing cover plate 31 to a closed position, the cards in the chamber 76 may be partially covered to expose only the problem-question portion, and thereafter fully exposed by shifting the plate 31 to the right. Then the card is shifted to the storage chamber 75 by returning the plate to the closed position.

In order to shift the cards from one compartment to another, the plates have tabs indented downwardly from the surface and act to catch upon the edge of the cards and shift them off the top of the stack to the storage area. These tabs are indicated by reference number 95 on plate 31. This type of card shifting in magazines is old and well-known and will be understood by those skilled in the art. As the plate 31 is shifted to its closed position these tabs will carry the topmost card with it and shift the card into the adjacent chamber. Because the magazine is carried at a slight angle with the horizontal end positioned in the machine, the cards will be gravity stacked.

Thus, as this reciprocating movement is repeated, the cards one by one are shifted from one card chamber to the other and are stacked in the storage chamber in inverse order with respect to the original stacking.

The indexing plate 32 has a smaller aperture corresponding to aperture 93 of plate 31 associated with the card chamber 75 for exposing only the problem portion. Thus the smaller aperture of plate 32 is diagonally opposite the smaller aperture 93 of plate 31. Similarly a larger aperture in plate 32 corresponding to aperture 94 in plate 31, communicates with the second card chamber 76 and is diagonally opposite the aperture 94. When all of the faces of one stack of cards 98 are shifted from the card chamber 76 to the card chamber 75 the entire magazine is reversed in the teaching machine. Reciprocation, once the magazine has been reversed, of the other indexing plate 32 will cause its tabs 99, to shift the cards 98 one at a time back to the card chamber 76.

Referring again to the views of the machine, the cover 19 includes a centrally located viewing aperture 34. A spring biased pad 35, as best seen in FIGURE 4, is disposed in the housing beneath the aperture 34. The pad 35 is carried on a mounting shaft 36. The shaft 36 is supported by and movable rectilinearly a limited distance along its axis relative to support 37 which is fixed to the housing. The limits of its movement are controlled by the pad in an inward or downward direction and a suitable limiting cap 38 fixed to the lower end of the shaft 36.

In the description of the magazine 30, it will be recalled there was no spring device internally of the magazine to keep the packet of cards pressed against the viewing face. The magazine 30, when detached from the illustrated teaching machine, will allow the cards to fall back and forth freely within the compartment. However, the cards within the magazine are never fully concealed, a large opening being positioned at the rear face of any set of cards when the magazine is positioned in the machine in the place provided. Thus, when the magazine 30 is seated upon the angle support surface 29 and then pressed into holding position against the surface 28, the pad 35 will be depressed against the force of its spring and hence will provide the necessary spring urge to the stack of cards in the right hand compartment when the magazine is placed in the machine. This presses the stack of cards against the one of the magazine plates which is the top plate again in the example cited, the plate 31. This upward biasing of the cards enables the indexing of the cards one at a time from their question position to the storage position in the other compartment in the magazine.

Figure 1:
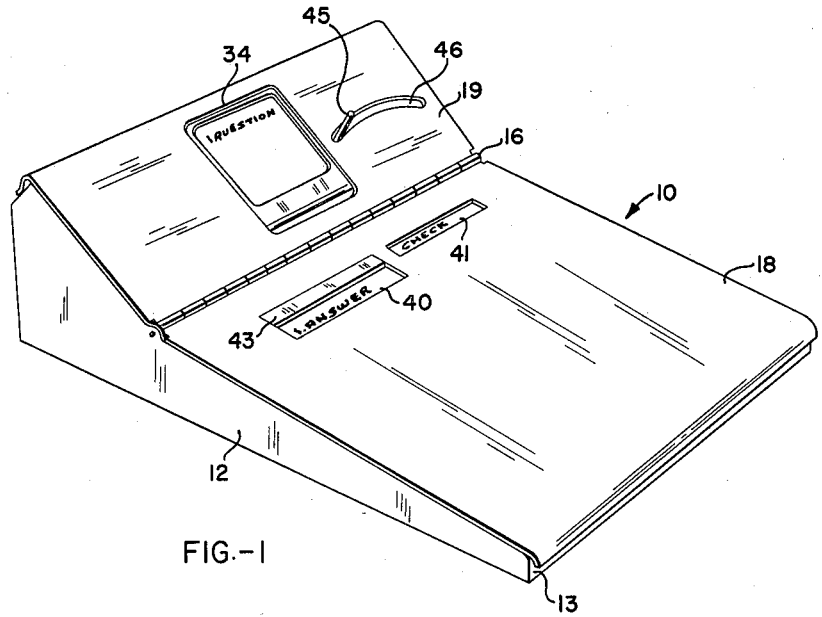
FIGURE 1 is a perspective illustration of the preferred embodiment of the machine.
Figure 2:
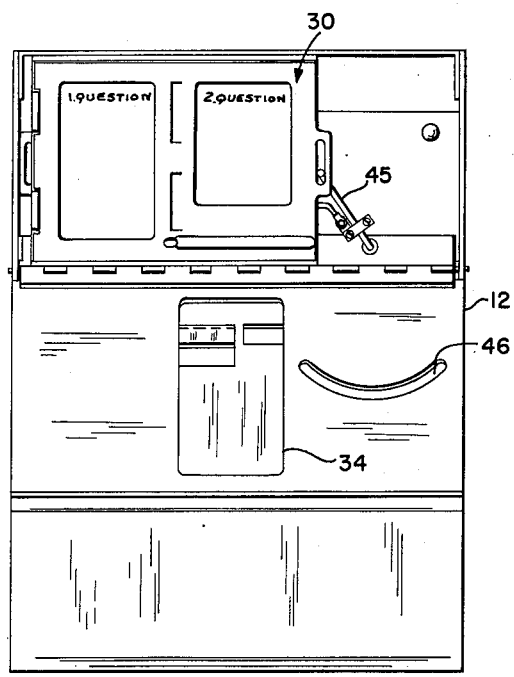
FIGURE 2 is a top plan view with the cover over the magazine containing portion swung to a full open position to reveal the location of a question card hold magazine.
Figure 3:
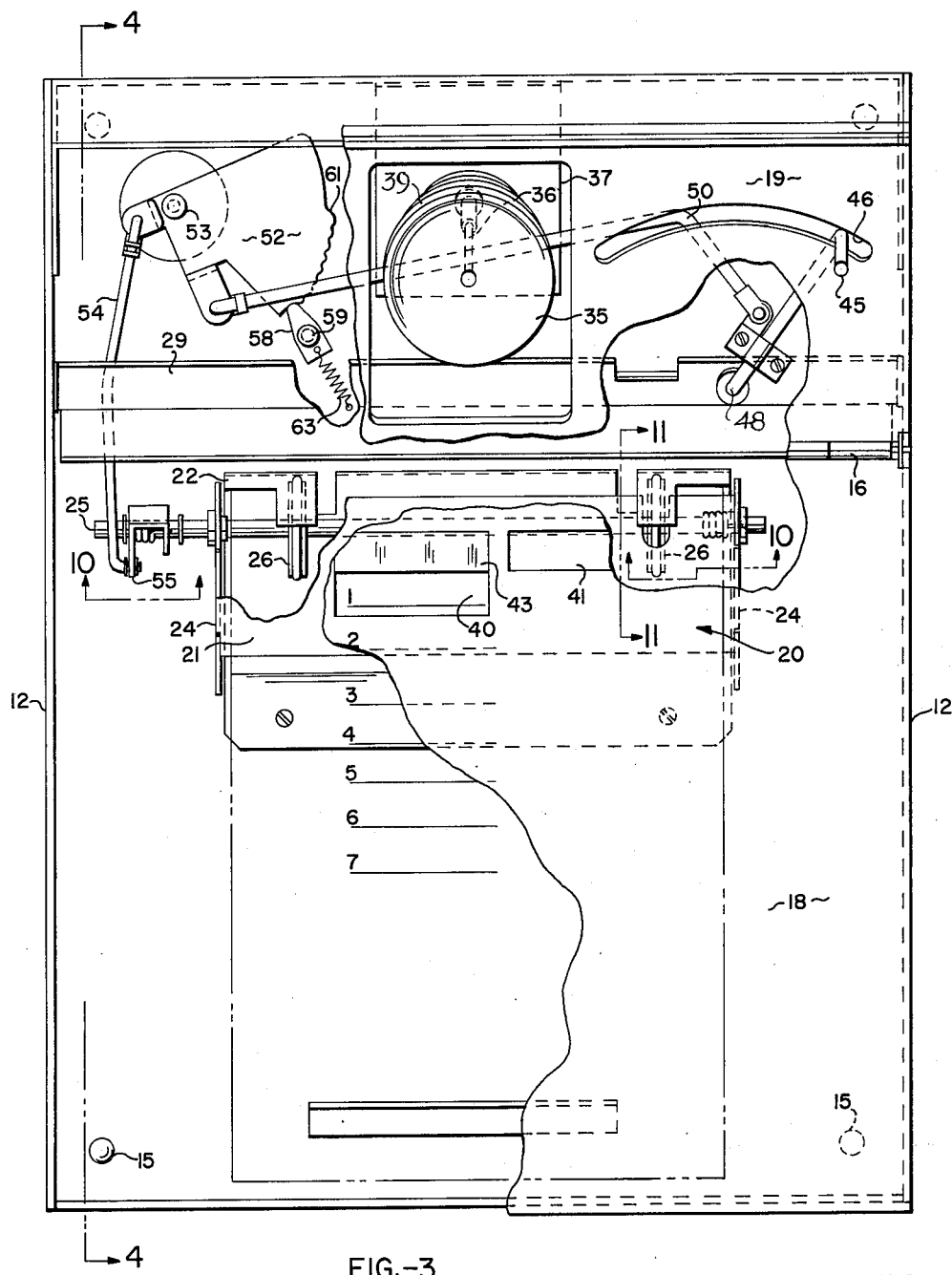
FIGURE 3 is an enlarged top plan view with the magazine removed and with portions broken away to reveal interior mechanism of the machine.

The front cover 18 has a rectangular writing slot 40 through which a response may be written upon a paper below the cover 18. A slot 41 is provided to enable writing along another portion of the paper. Half of the slot 40 is opened and the other half is closed by a transparent window 43. The slot 41 is positioned in transverse alignment with the window 43 and the two apertures are positioned side-by-side at the transverse center of the top front cover 18 near the hinge 16. An answer sheet is positioned on the answer sheet supporting structure 20. When the student has written his first answer on this sheet, he advances the indexing means. This act advances the answer sheet one space such that his answer will now be positioned immediately beneath the window 43 as shown in FIGURE 3, and the corresponding correction space will be positioned immediately beneath the slot 41. Simultaneously, the top plate of the question magazine will be shifted to its open position placing the larger aperture over the first question card. This indexing exposes both the question and answer, and the student's answer remains exposed but inaccessible under the transparent cover. The student can then compare the question and the correct answer with his own answer visible through the window 43. If his answer is incorrect, he then writes the correct answer in the correction space of slot 41 adjacent his answer. He then concludes the indexing cycle by returning the cover indexing plate to its closed position, thereby presenting a new card.

In this second portion of the indexing cycle, the answer sheet remains stationary. The top plate of the magazine, on the other hand, returns to its initial position, carrying with it the first card which is shifted to the storage position and exposing the question, only of the second card. The entire process is then repeated with regard to the second question and sequentially through the remainder of questions in this elected and programmed group.

One of the advantages of this invention is obtained through the novel and improved indexing means which during a first portion of the cycle simultaneously advances the answer sheet and exposes the answer and then during a return or second portion of the cycle shifts the first question card to a storage position exposing only the question of the second card and leaving the answer sheet in the same position.

The device to achieve this index step will be understood best by first referring to FIGURE 3. Exposed through cover 19 is a control handle 45 projecting through an arcuately curved handle aperture 46. The handle 45 extends to a pivot portion 48. The pivot portion 48 is journaled in the angle member 29 on the axis of the center of curvature of the arcuately curved handle slot 46. As previously described, when the magazine 30 is installed in appropriate position, one or the other of the handle members of the magazine will be extended to the right, and the slot of the handle is provided to enable the actuation handle 45 to extend through the plate slot as well as through the arcuate slot on the cover plate. Hence, when the handle is pivoted back and forth in the curved slot of the cover plate it also causes the cover plate with which it is engaged to reciprocate with respect to the magazine 30. Thus, pivotal movement of the handle back and forth within the limits provided by the handle aperture 46 will cause the connected indexing plate to shift back and forth as described.

A link 50 extends across the housing beneath the magazine. Link 50 is pivotally connected to both the handle 45 and an indexing plate 52 near the left side of the housing. This indexing plate 52 is more accurately described as a motion converting link. It is pivotally mounted at 53 on the lower wall 11 of the housing. An indexing arm 54 extends forwardly from the plate 52 to a paper indexing mechanism associated with the structure 20.

Shaft 25, journaled in the side walls of the structure 20, is equipped at one end with a swing arm 55. Arm 55 is connected to shaft 25 through a coil spring device 56. Spring 56 has one end connected to the shaft 25 and the other to the arm 55. As the plate 52 is rotated counterclockwise (as viewed in FIG. 12), the spring 56 is tightened around the shaft, gripping the shaft and causing rotation.

A spring 57 on the opposite end of the shaft 25 is connected to the side plate 24. Any attempted reversal of rotative direction will cause the spring 57 to tighten and prevent such rotation. Such spring type clutches are well-known and hence will be understood. In the particular environment of this application, however, it will be quickly apparent that whenever the handle 45 is moved to the right in its slot 46 away from the magazine 30, the shaft 25 will be indexed and cause the paper held by the device of structure 20 to move forward an indexed amount. However, upon return of handle 45 to the left, no further actuation in either direction of the shaft 25 will take place and the paper will remain stationary. A return of the handle 45 to the right hand side will, however, shift the plate of the magazine to expose the card in the right hand compartment to the larger opening.

Whenever the student is ready to shift a card he must make a full movement of the handle in order to completely index his answer paper in proper relationship to the opening slots through which he must write. Furthermore, it must be impossible to partially expose the answer in order to obtain a clue and then reverse the apparatus to bring the paper back into position where the improperly obtained information can then be recorded as an answer. In order to accomplish this assurance of a full cycle, the plate 52, which serves as the motion transfer link, also is employed as a detent ratchet. Plate 52 has a large segment portion having a series of ratchet teeth 60 along the peripheral edge. A detent 58 is pivotally mounted adjacent the peripheral edge to engage in these teeth. A pivot 59 mounted on the lower wall 11 provides this mounting. Reference to FIGURE 12 will quickly indicate the operation of this non-reversing linkage feature. The detent is of sufficient length that it engages into the teeth 60 as the plate 52 is pivoted and reversal of the plate 52 is impossible because the detent 58 does not have sufficient room to pivot between the plate and its own pivot point. However, once the plate 52 has been pivoted until the teeth are completely past the detent, then the detent can swing around its own pivot and the plate and teeth may be returned past the detent without engagement. The detent rides freely over the teeth during this return movement. At the opposite end of the series of teeth 60 there is a release shoulder end surface 61 in order that the detent may swing about its own pivot and retain its engagement position. A spring 63 urges the detent into engagement position.

The teaching operation

When the mechanism is used, the student first opens the question cover plate 19. He shifts the handle 45 to the extremity of its travel nearest the center of the device. He then positions the magazine, with the plates 31, 32 in their closed positions, in the space immediately beneath the cover 19 and against the supporting surfaces 28, 29. Assuming the plate 31 is to be the top plate in this position, the magazine 30 is positioned such that the pad 35 projects through the aperture in plate 32 against the cards 98 which are stacked in the card compartment 76. The magazine is positioned with the handle 45 projecting through the elongated slot 82. The magazine is pressed down until it abuts the surfaces 28, 29 and its side plates 72, 73 are frictionally gripped by the housing. Cover 19 is then closed with handle 45 projecting through the arcuate handle aperture 46. Finally, the cover 18 is opened and a question sheet is placed on the surface 21 and extended over rolls 26 with the first question space immediately below the open portion of the question aperture 40. He writes what he believes to be the correct answer in the first answer space. He next shifts the handle 45 until it strikes the outward extremity of the arcuate handle slot 46. This shifts the indexing plate 31 until its larger aperture 94 is oriented above the topmost question card exposing the answer. Simultaneously, the linkage 50, 52, 54 actuates the lever 55 to rotate the shaft 25. The rotation of the shaft 25 shifts the first question space under the window 43 to the position where it is still visible but now inaccessible. Simultaneously, the first correction space is positioned below the question aperture 41. The student then studies the exposed answer on the topmost one of the question and answer cards 98. If his answer is incorrect, he writes the correct answer on the correction space beneath the aperture 41.

Next, the student returns the handle 45 to its initial position abutting the inner end of the arcuate handle aperture 46. This pivotal movement of the handle returns the indexing plate 31 to its initial position. During this return of the handle, the indexing tabs 95 will abut the topmost question card carrying it from the card compartment 76 to the compartment 75. This procedure is repeated one card at a time as the student reads each question, answers it, and then shifts the card to the storage position. It should be noted here that the cards are stacked in reverse relationship as they are shifted from one compartment to the other.

After the student has reviewed all of the questions on one face of the cards, and thus completed one group of questions, all of the cards will have shifted to the compartment 75. The student then opens the cover 19, removes the magazine 30, and inverts it. He repositions the magazine, this time with the indexing plate 32 as the topmost plate. The slot 82 is positioned over the handle 45 and the pad projects through the aperture 94 to bias the cards, in their now inverted relationship, against the plate 32. The cycle is now repeated with the student answering questions of a second group presented on the faces of the cards opposite the questions of the first group. Depending upon the size of the answer sheet used, the student may be required to position a second answer sheet before the second group of questions is used, or if the sheet is large enough, he, of course, can continue the procedure writing the answers on the lower portion of the same and larger sheet.

While the invention has been described with a great deal of detail it is believed that it essentially comprises a novel and improved teaching machine which has means to sequentially expose a question, next the same question and its answer, and then a succeeding question while a question sheet is moved in synchronization so that a question space is exposed when a corresponding question is exposed, the question space is moved to a visible but inaccessible position when the answer is exposed and a correction space is exposed when the answer is exposed.

The invention has been described in its preferred form with a certain degree of particularity. However, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A teaching aid comprising, a housing including walls defining a support portion and a top spaced from the support portion, said housing walls also defining an answer sheet access aperture, an answer sheet supporting and moving structure within the housing and accessible through said access aperture, said top including an answer aperture and a correction aperture above said answer sheet structure, said structure including a writing surface positioned immediately below such answer and correction apertures, whereby a writing implement projected through a selected one of the answer and correction apertures may be used to write on an answer sheet carried by the structure, a window in the answer aperture and extending transversely thereacross, the window being transversely aligned with the correction aperture such that when an answer space is oriented below the window the corresponding correction space will be oriented below the correction aperture, said housing walls also defining a viewing aperture, card means in the housing for carrying a plurality of question and answer cards, said card means including cyclic means to cyclically position the answer and question cards in a viewing position alinged with said viewing aperture, said card means including answer covering means to cover the answer portion of a card during a portion of each cycle, indexing means to actuate the card means and move a new question card into viewing alignment with the viewing aperture during a first portion of the cycle and to shift the answer covering means to expose the answer during a second portion of the cycle, said indexing means being connected to said structure to advance an answer sheet one space during said second portion of the cycle only whereby an answer space corresponding to a question presented on a card will be moved under said window and away from access by pupil each time the answer to a question is exposed.

2. A teaching aid comprising a housing including a support portion and cover spaced from the support portion, said cover being movable to provide access to the interior of the housing, an answer sheet supporting and moving structure within the housing and accessible when the cover is moved to an open position, said housing including an answer aperture and a correction aperture above said answer sheet structure, said structure including a writing surface positioned immediately below such apertures whereby a writing implement projected through one such aperture may be used to write on an answer sheet carried by the structure, a window in the answer aperture and extending transversely thereacross, the window being transversely aligned with the correction aperture such that when the answer space is oriented below the window the corresponding correction space will be oriented below the correction aperture, said housing also including a viewing aperture, card means in the housing for carrying a plurality of question and answer cards, said card means including cyclic means to cyclically position the question and answer cards in a viewing position aligned with said viewing aperture, said card means including answer covering means to cover the answer portion of a card during a portion of each cycle, indexing means to actuate the card means and move a new question card into viewing alignment with the viewing aperture during a first portion of the cycle and to shift the answer covering means to expose the answer during a second portion of the cycle, said indexing means being connected to said structure to advance an answer sheet one space during said second portion of the cycle only whereby an answer space corresponding to a question presented on a card will be moved under said window and away from access by pupil each time the answer to a question is exposed.

3. A teaching aid comprising a housing including walls defining a support portion and a top spaced from the support portion, said housing walls also defining an answer sheet access aperture, an answer sheet supporting and moving structure within the housing and accessible through said access aperture, said top including an answer aperture and a correction aperture above said answer sheet structure, said structure including a writing surface positioned immediately below such answer and correction apertures whereby a writing implement projected through a selected one of the answer and correction apertures may be used to write on an answer sheet carried by the structure, a window in the answer aperture and extending transversely thereacross, the window being transversely aligned with the correction aperture such that when an answer space is oriented below the window the corresponding correction space will be oriented below the correction aperture, said housing also including a viewing aperture, a question magazine for carrying a plurality of question and answer cards removably positioned in the housing, said magazine including means to cyclically position the question and answer cards in a viewing position aligned with said viewing aperture, said magazine including other means to cover the answer portion of a card during a portion of each cycle, indexing means to actuate the magazine and move a new question card into viewing alignment with the viewing aperture during a first portion of the cycle and to shift the answer covering means to expose the answer during a second portion of the cycle, said indexing means being connected to said structure to advance an answer sheet one space during said second portion of the cycle only whereby an answer space corresponding to a question presented on a card will be moved under said window and away from access by pupil each time the answer to a question is exposed.

4. A teaching aid comprising a housing including walls defining a support portion and a top spaced from the support portion, said housing walls also defining an answer sheet access aperture, an answer sheet supporting and moving structure within the housing and accessible through said access aperture, said top including an answer aperture and a correction aperture above said answer sheet structure, said structure including a writing surface positioned immediately below such answer and correction apertures whereby a writing implement projected through a selected one of the answer and correction apertures may be used to write on an answer sheet carried by the structure, a window in the answer aperture and extending transversely thereacross, the window being transversely aligned with the correction aperture such that when an answer space is oriented below the window the corresponding correction space will be oriented below the correction aperture, said housing walls also defining a viewing aperture, card means in the housing for carrying a plurality of question and answer cards, said card means including cyclic means to cyclically position the question and answer cards in a viewing position aligned with said viewing aperture, said card means including answer covering means to cover the answer portion of a card during a portion of each cycle, an indexing arm pivotally carried in the housing and slidably connected to the said means to actuate the card means and move a new question card into viewing alignment with the viewing aperture during a first portion of the cycle and to shift the answer covering means to expose the answer during a second portion of the cycle, an indexing linkage connecting the arm to said structure, said linkage including unidirectional clutch means to advance an answer sheet one space during said second portion of the cycle only whereby an answer space corresponding to a question presented on a card will be moved under said window and away from access by pupil each time the answer to a question is exposed.

5. In a teaching machine having a housing and a question card supporting magazine including a rectilineally movable indexing plate in the housing for sequentially moving question cards, and an answer sheet structure in the housing and including answer sheet advancing means, the combination of, an actuating handle including a movably connected pivot connected to the housing, the handle being connected to said indexing plate for causing rectilineal indexing movement of the said plate when the handle is moved relative to the housing, a motion converting link pivotally mounted in the housing, an actuating link pivotally connected to both the handle and the motion converting link, and an eccentric connected to said sheet advancing means and including a unidirectional clutch means, and an eccentric link pivotally connected to both the eccentric and the motion converting link.

6. The device of claim 5 wherein the motion converting link includes a plurality of teeth and wherein a pawl is pivotally mounted in the housing with a biasing spring connected to the pawl and the housing and wherein the pawl is engageable with the teeth in opposite directions of movement of the motion converting link to prevent movement in an opposite direction once movement in either direction has commenced.

7. The device of claim 5 wherein said answer sheet advancing means includes a shaft journaled in said housing, and wherein said unidirectional clutch means includes at least one coil spring disposed around said shaft and compressed into gripping engagement with the shaft during one direction of eccentric movement only.

8. In a teaching machine having a housing and a question card supporting magazine including a rectilineally movable indexing plate in the housing for sequentially moving question cards, and an answer sheet structure including a rotatable answer sheet advancing shaft in the housing, the combination of, an actuating handle including a pivot portion journaled in the housing, the handle being slidably connected to such indexing plate for causing reciprocation of the plate when the handle is rotated about the pivot portion, the handle also having a gripping portion paralleling the pivot portion with the mentioned portions connected together in spaced relationship by a supporting arm portion, a motion converting link pivotally mounted in the housing, an actuating link pivotally connected to both the handle and the motion converting link, and an eccentric connected to such shaft, a unidirectional clutch means between the eccentric and the shaft, and an eccentric link pivotally connected to both the eccentric and the motion converting link.

9. The device of claim 8 wherein said actuating link is pivotally connected to the handle along the supporting arm portion and at a connection between the axis of the pivot portion and the part of the handle connectable to the indexing plate.

10. A teaching machine comprising a housing, an answer sheet structure in the housing and means to advance an answer, a magazine removably carried in the housing, said magazine including a frame structure having walls defining the perimeter of a storage space and a partition dividing the space into first and second card storage compartments, the walls including guide means, first and second spaced indexing means carried in the guide means, each such indexing means being movable in its associated guide means and including card engaging portions to engage the cards one at a time and sequentially shift the cards from an exposed position in one compartment to a storage position in the other, an actuating handle movably connected to the housing, the handle being connected to a selected one of said indexing means for causing reciprocation of the connected indexing means when the handle is moved relative to the housing, and sheet indexing means carried by the housing and connected to the sheet advancing means to actuate the latter in synchronization with the magazine indexing means.

11. The device of claim 10 wherein said sheet indexing means comprises a motion converting link pivotally mounted in the housing, an actuating link pivotally connected to both the handle and the motion converting link, an eccentric connected to the sheet advancing means, a unidirectional clutch means between the eccentric and the sheet advancing means, and an eccentric link pivotally connected to both the eccentric and the motion converting link.

References Cited by the Examiner

UNITED STATES PATENTS

| | | | |
|---|---|---|---|
| 2,169,266 | 8/39 | Matter | 35—9 |
| 2,853,816 | 9/58 | Rogas | 40—78 |
| 2,915,833 | 12/59 | Genest | 35—48 X |
| 2,987,828 | 6/61 | Skinner | 35—9 |
| 3,056,215 | 10/62 | Skinner | 35—9 |

OTHER REFERENCES

"Machine Is Teacher," Washington Post and Times Herald (newspaper), Friday, March 6, 1959, page B2. (Copy in Div. 23.)

CHARLES A. WILLMUTH, *Primary Examiner.*

A. BERLIN, JEROME SCHNALL, *Examiners.*